United States Patent [19]
Cullen et al.

[11] Patent Number: 5,933,823
[45] Date of Patent: Aug. 3, 1999

[54] IMAGE DATABASE BROWSING AND QUERY USING TEXTURE ANALYSIS

[75] Inventors: John Cullen, Redwood City; Jonathan Hull, Cupertino; Peter Hart, Menlo Park, all of Calif.

[73] Assignees: Ricoh Company Limited, Tokyo, Japan; Ricoh Corporation, Menlo Park, Calif.

[21] Appl. No.: 08/609,641

[22] Filed: Mar. 1, 1996

[51] Int. Cl.$^6$ .................................................. G06F 17/30
[52] U.S. Cl. ........................................ 707/6; 707/530
[58] Field of Search ...................... 345/333, 443, 345/166; 358/453, 462, 409; 364/725.03; 382/305, 215; 707/3, 4, 5, 530, 6

[56] References Cited

U.S. PATENT DOCUMENTS

| | | | |
|---|---|---|---|
| 4,568,983 | 2/1986 | Bobick | 358/409 |
| 4,885,704 | 12/1989 | Takagi et al. | 345/166 |
| 4,888,690 | 12/1989 | Huber | 707/4 |
| 4,939,671 | 7/1990 | Sasser | 345/443 |
| 5,027,421 | 6/1991 | Kanno | 382/305 |
| 5,088,052 | 2/1992 | Spielman et al. | 707/4 |
| 5,133,052 | 7/1992 | Bier et al. | 707/530 |
| 5,142,619 | 8/1992 | Webster, III | 707/530 |
| 5,168,565 | 12/1992 | Morita | 707/3 |
| 5,189,709 | 2/1993 | Wang et al. | 382/215 |
| 5,287,275 | 2/1994 | Kimura | 707/5 |
| 5,295,077 | 3/1994 | Fukuoka | 364/725.03 |
| 5,369,507 | 11/1994 | Tanaka et al. | 358/462 |
| 5,404,514 | 4/1995 | Kageneck et al. | 707/5 |
| 5,406,384 | 4/1995 | Sakuragi | 358/453 |
| 5,408,339 | 4/1995 | Sasaki et al. | 358/462 |
| 5,412,807 | 5/1995 | Moreland | 707/3 |
| 5,418,948 | 5/1995 | Turtle | 707/4 |
| 5,423,033 | 6/1995 | Yuen | 707/4 |
| 5,465,353 | 11/1995 | Hull et al. | 707/5 |

OTHER PUBLICATIONS

Sumner, Mary. "Computers: Concepts and Uses." 2d. ed. (Englewood Cliffs: Prentice Hall, 1988) 126.
Robert M. Haralick, K. Shanmugam and I. Dinstein, "Textural Features for Image Classification", IEEE Trans. Sys., Man, Cybernetics, vol. SMC–3, No. 6, Nov. 1973.
Chen, C.H., "A Study of Texture Classification Using Spectral Features", ICPR, Munich, Oct. 19–22, 1982, pp. 1064–1067.
Laws, Kenneth I., "Texture Energy Measures", Processing Image Understanding Workshop, Nov. 1979.
Wang, Dacheng and Sargur N. Srihari, "Classification of Newspaper Image Blocks Using Texture Analysis", Suny Buffalo report.
Anil K. Jain and Farshid Farrokhnia, "Unsupervised Texture Segmentation Using Gabor Filters", Pattern Recognition, vol. 24, No. 12, pp. 1167–1186, 1991.
Bloomberg, Dan S., "Multiresolution Morphological Analysis of Document Images", SPIE vol. 1818, Visual Communications and Image Processing 1992.
Yan, Lü, "Interest Operators and Fast Implementation", IDP, 1988.

*Primary Examiner*—Joseph H. Feild
*Assistant Examiner*—John L. Young
*Attorney, Agent, or Firm*—Townsend and Townsend and Crew LLP

[57] ABSTRACT

Method and apparatus for querying a document image database based on texture, i.e., analytically discernable patterns in the document images of the database. According to the invention, a document image database could be browsed for documents with a particular texture in a variety of ways. For example, a user could input an example document image with a similar appearance to the desired document. Alternatively, the user could employ a simple interface to define a synthetic document based on selection of a few categories. The synthetic document would then serve as an example for search. Or the user may employ a graphical interface to more precisely define an example for search. Thus, the user's knowledge of the general appearance of the desired document or documents provides the basis for the search.

36 Claims, 11 Drawing Sheets

Hierarchical Browsing

User Starts HERE

Finds Leaf Cluster

Retrieved Images

*FIG. 5*

IMAGE DATABASE BROWSING AND QUERY USING TEXTURE ANALYSIS

BACKGROUND OF THE INVENTION

The present invention relates to a method and apparatus for browsing an image database and more particularly to method and apparatus for browsing an image database based on a known texture of a desired document.

With the broad diffusion of low cost permanent electronic storage devices and scanners for electronically capturing document images, creation and storage of large document image databases become possible. Applications of such image databases include electronic libraries, medical documents, administrative records, news clippings, maps, government forms, manuals, etc. In general, it is now often less expensive to scan a document and store it on an electronic storage medium than to physically store the document.

Such large document image databases present the problem of identifying and retrieving desired documents from the database. One known technique for querying a document database is to search for a text string or combination of text strings that would likely be found in a desired document. For scanned documents, this technique relies on accurate optical character recognition which may not always be feasible. Also, it is often difficult to generate a text string or strings which are both found in a desired document and sufficiently distinguish the desired document from others.

Often a user knows something about how a desired document looks. It would be beneficial to use this information in querying a document image database.

SUMMARY OF THE INVENTION

The present invention provides method and apparatus for querying a document image database based on texture, analytically discernable patterns in the document images of the database. According to the invention, a document image database could be browsed for documents with a particular texture in a variety of ways. For example, a user could input an example document image with a similar appearance to the desired document. Alternatively, the user could employ a simple interface to define a synthetic document based on selection of a few categories. The synthetic document would then serve as an example for search. Or the user may employ a graphical interface to more precisely define an example for search. Thus, the user's knowledge of the general appearance of the desired document or documents provides the basis for the search.

Once the user has initiated the query, one or more document images are selected based on the similarity of their textures to the example. These images could be displayed or printed in iconic form on paper. The user may initiate further browsing by selecting a displayed document as a search key for a new query. In one embodiment, document images in the database are clustered together and when a query is made, representations are displayed for clusters including images texturally similar to the search key.

In one embodiment, when the user requests display of multiple pages of a document, pages having a similar appearance are identified. For pages identified as having a similar appearance, images of the pages are displayed superimposed over one another and slightly offset.

In accordance with one aspect of the invention, the basis for document image searches is an analysis of the texture of each image. A feature vector is extracted for each image. Similarity between images is based on a distance metric as applied to the feature vectors. In the preferred embodiment, the feature vector has 80 elements and is based on four different ways of processing the image. The first 20 elements are based on a histogram of connected component sizes throughout the image. The second 20 elements are obtained from a survey of interest points throughout the document. The third 20 elements are obtained from a vertical projection histogram of connected components. The last set of 20 elements are obtained by partitioning the document into 20 cells and summing the connected components in each cell.

In one embodiment, searches based on a combination of image texture and text are used to query an image database where optical character recognition (OCR) has been performed on the images of the database. By combining the two data types, text can be used to search the OCR data associated with the image, and the texture data used to search based on the general appearance of the image.

A further understanding of the nature and advantages of the inventions herein may be realized by reference to the remaining portions of the specification and the attached drawings.

BRIEF DESCRIPTION OF THE DRAWINGS

FIG. 5 depicts how search results may be displayed for a clustered image database in accordance with one embodiment of the present invention.

DESCRIPTION OF SPECIFIC EMBODIMENTS

System Suitable for Implementation of Present Invention

Figure 1:
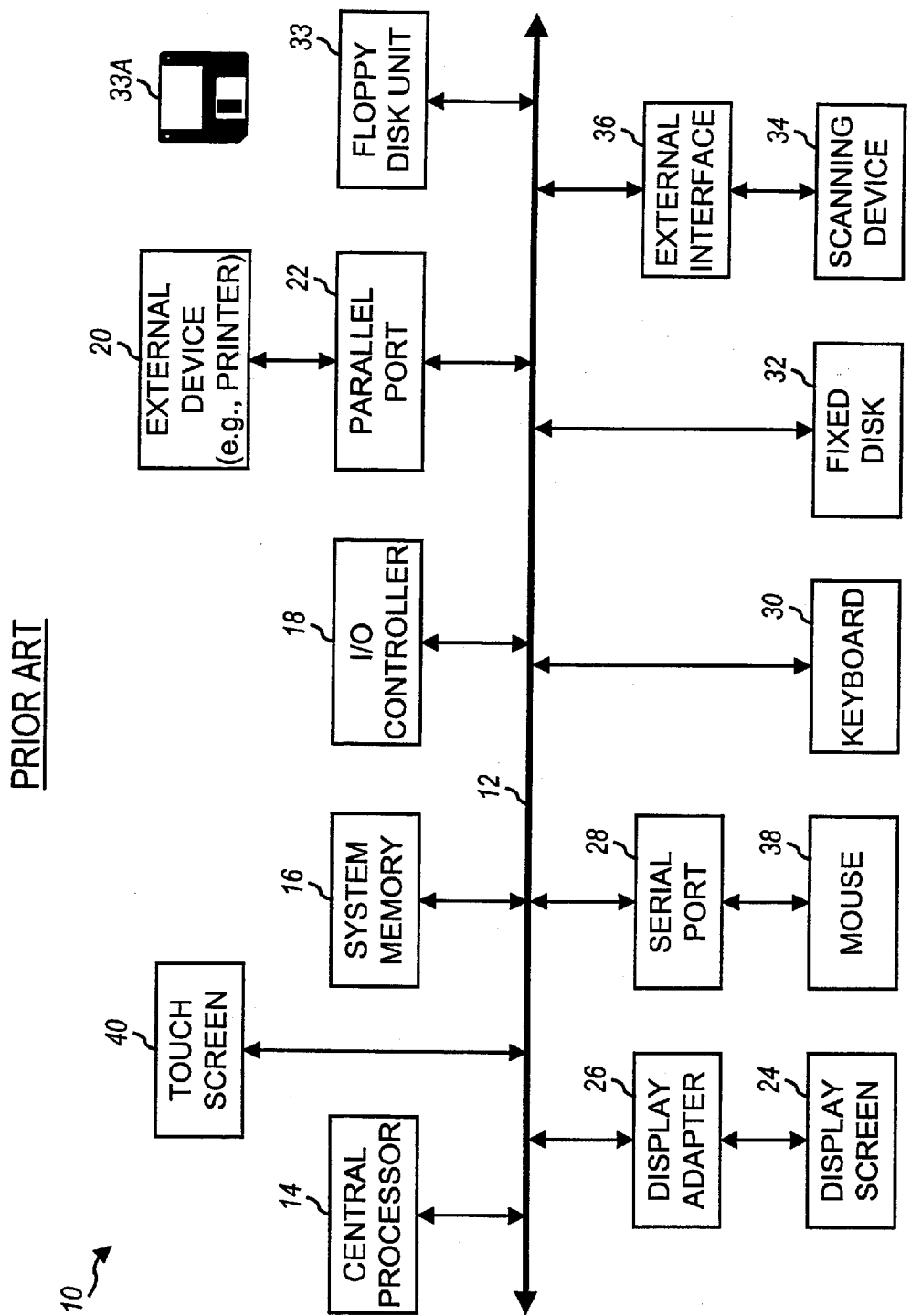
FIG. 1 depicts a computer system suitable for implementing the present invention.

FIG. 1 shows basic subsystems of a computer system suitable for use with the present invention. In FIG. 1, computer system 10 includes bus 12 which interconnects major subsystems such as central processor 14, system memory 16, input/output (I/O) controller 18, an external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A. An image database may also be stored on fixed disk 32.

Display screen 24 is similar to that in use on standard computers such as personal computers or workstations employing a CRT screen or monitor. Various forms of user input devices may be used with the present invention. For example, a mouse input device that allows a user to move a pointer displayed on the display screen in accordance with user hand movements is a standard user input device. A mouse usually includes one or more buttons on its surface so that the user may point to an object on the screen by moving the mouse and may select the object, or otherwise activate the object, by depressing one or more buttons on the mouse. Alternatively, a touch screen allows a user to point to objects on the screen to select an object and to move the selected object by pointing to a second position on the screen. Various buttons and controls may be displayed on the screen for activation by using the mouse or touch screen. Fixed disk drive 32 may be a hard disk drive or an optical drive or any medium suitable for storing a database of document images.

Overview of Searching Procedure

The present invention provides a document image database searching system based on the use of example documents as keys for the search. By interacting with the system of the present invention in one of a number of ways, the user develops an example image. Preferably, based on a texture of the example image, the system finds one or more matches and displays them as search results. The user may then select a matching image as a key for further search of the database.

Figure 2:
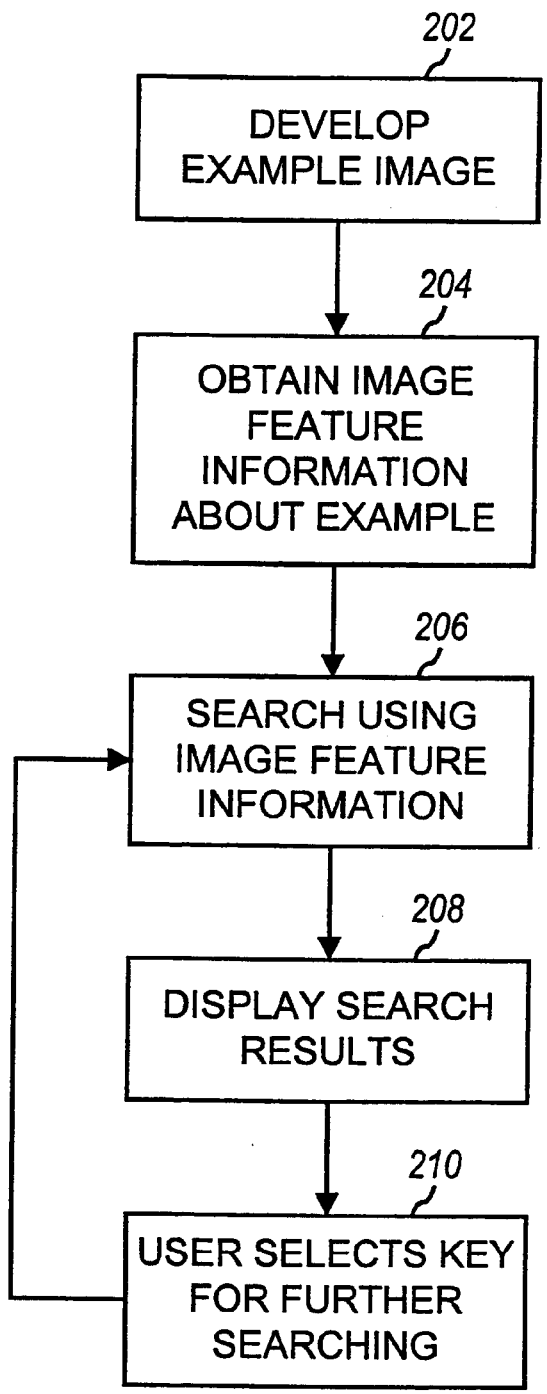
FIG. 2 depicts a top-level flowchart describing the operation of the document image database querying system of the present invention.

FIG. 2 depicts a top-level flowchart describing the operation of the document image database querying system of the present invention. At step 202, an example image is developed. For example, the user could retrieve a known example image from disk drive 32. Or, the user could scan an image in using scanning device 34. Other techniques for developing an example image are explained with reference to FIGS. 3 and 4.

The example image developed at step 202 is used as the basis for the search. The search relies on a comparison of image features as evaluated over regions of the document. The effect is to find document images having a similar general appearance to the document image. Accordingly, at step 204, image feature information about the example document image is obtained. Preferably, this image feature information takes the form of an image feature vector, the composition of which is discussed in reference to FIGS. 7A–7E.

The database preferably includes similarly obtained image feature information for the database images. At step 206, the image feature information obtained from the example document image is used as a key for a search of the database. In the preferred embodiment where the image feature information is a feature vector, a Euclidean distance metric is preferably used to find document images similar to the example. Alternatively, a Mahalanobis distance, Hausdorff distance, or weighted matching scheme could be used to find similar document images. In one embodiment, the searching procedure takes advantage of clustering in the image database to find cluster nodes representing points close to the example image in the image feature vector space.

At step 208, similar document images are displayed. In one embodiment, the three most similar images in the database are displayed. Alternatively, icons representing clusters containing images with similar characteristics are displayed.

At step 210, the user may select one of the displayed document images or cluster icon as a key for further searching. The system then uses the selected image or cluster icon as a new example document image and returns to step 206.

In one embodiment, the image database includes document images in encrypted form. The feature information used to search is however unencrypted. When desired document images are identified, they are decrypted for display. In the prior art, unencrypted document databases were searched using unencrypted keyword information. The approach provided by the present invention is advantageous in that the unencrypted image feature information is not readily comprehensible and still provides a measure of security. In contrast, the keywords left unencrypted in the prior art may be readily understood, compromising security.

In a related embodiment, the image database includes document images in compressed form while the feature information used to search is uncompressed. When desired document images are identified, they are decompressed for display.

User Interfaces For Developing Example Image

Figure 3:
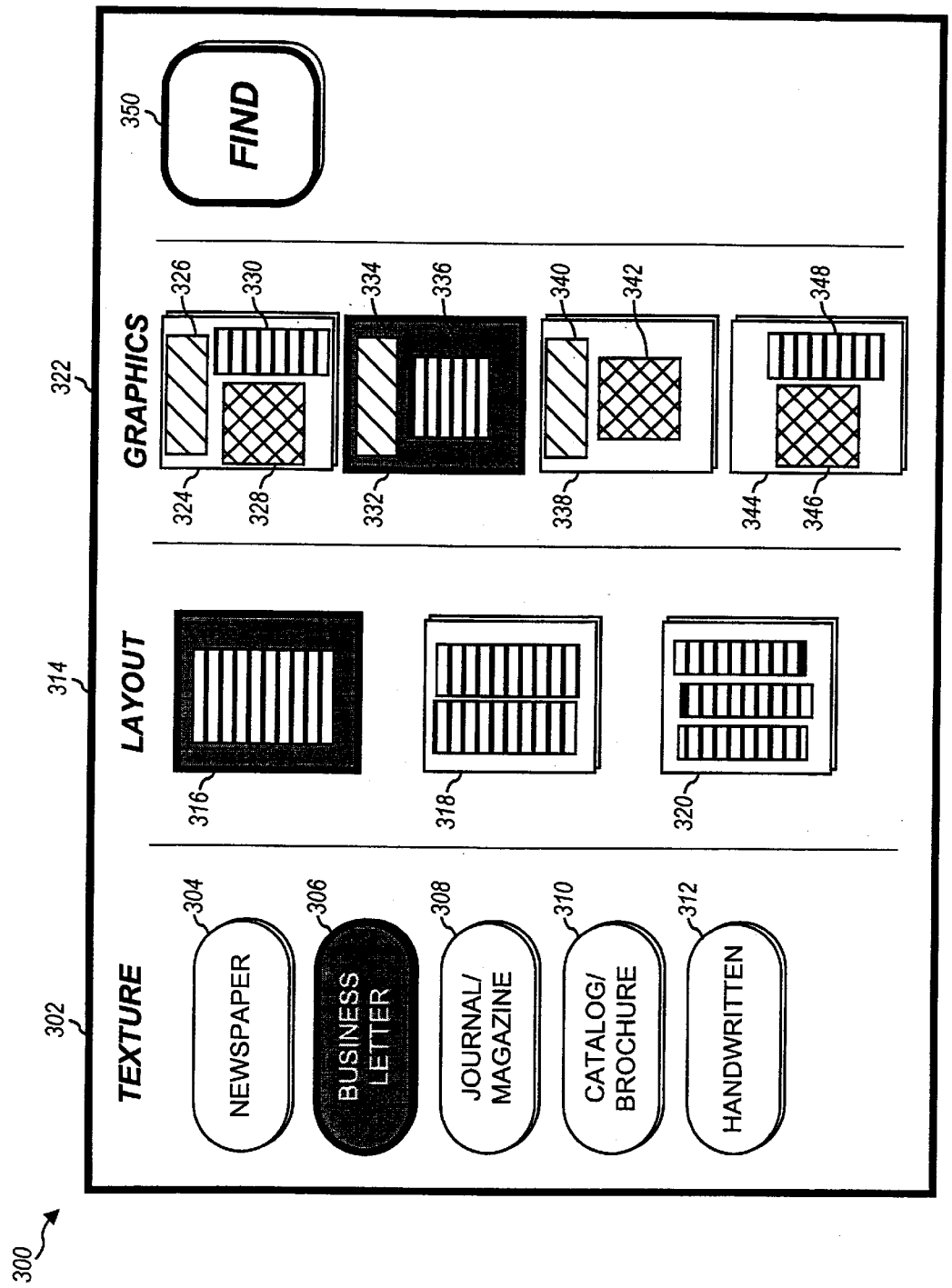
FIG. 3 depicts a user interface screen for developing a synthetic document image based on category selections as an example to initiate a search in accordance with one embodiment of the present invention.

FIG. 3 depicts a user interface screen 300 for developing a synthetic document image based on category selections as an example to initiate a search in accordance with one embodiment of the present invention. User interface screen 300 could be implemented on touch screen 40 with the user making selections specifying choices of categories by touching the various displayed buttons. Alternatively, a mouse or other comparable input device could be used to select the various categories.

A first column 302 of buttons entitled "texture" allows the user to select a document type. Buttons are provided for "newspaper" 304, "business letter" 306, "journal/magazine" 308, "catalog/brochure" 310, and "handwritten" 312. The user selects the document type for documents that he/she is seeking.

A second column 314 of buttons entitled "layout" allows the user to select the number of columns of text that would be found in the documents he/she is seeking. Buttons are provided for one column 316, two columns 318, and three columns 320.

A third column 322 of buttons entitled "graphics" allows the user to select the relative arrangement of a document title, text, and a graphic image as would be found in a desired search result. Each button depicts one possible arrangement. A button 324 shows a title 326 located above a graphic image 328 and text 330. A button 332 shows a title 334 above text 336. A button 338 shows a title 340 above a graphic image 342. A button 344 shows a graphic image 346 next to text 348.

By making one selection from each of the three columns, the user can quickly convey the general appearance of the desired document or documents. After the user has made his/her selections, activating a "find" button 350 initiates a search based on image feature information corresponding to the user's selections. The user's selections can be understood as specifying an example document image which serves as a key for the search in the same way that a scanned image would. of course the various categories and choices shown in FIG. 3 are only representative.

Figure 4:
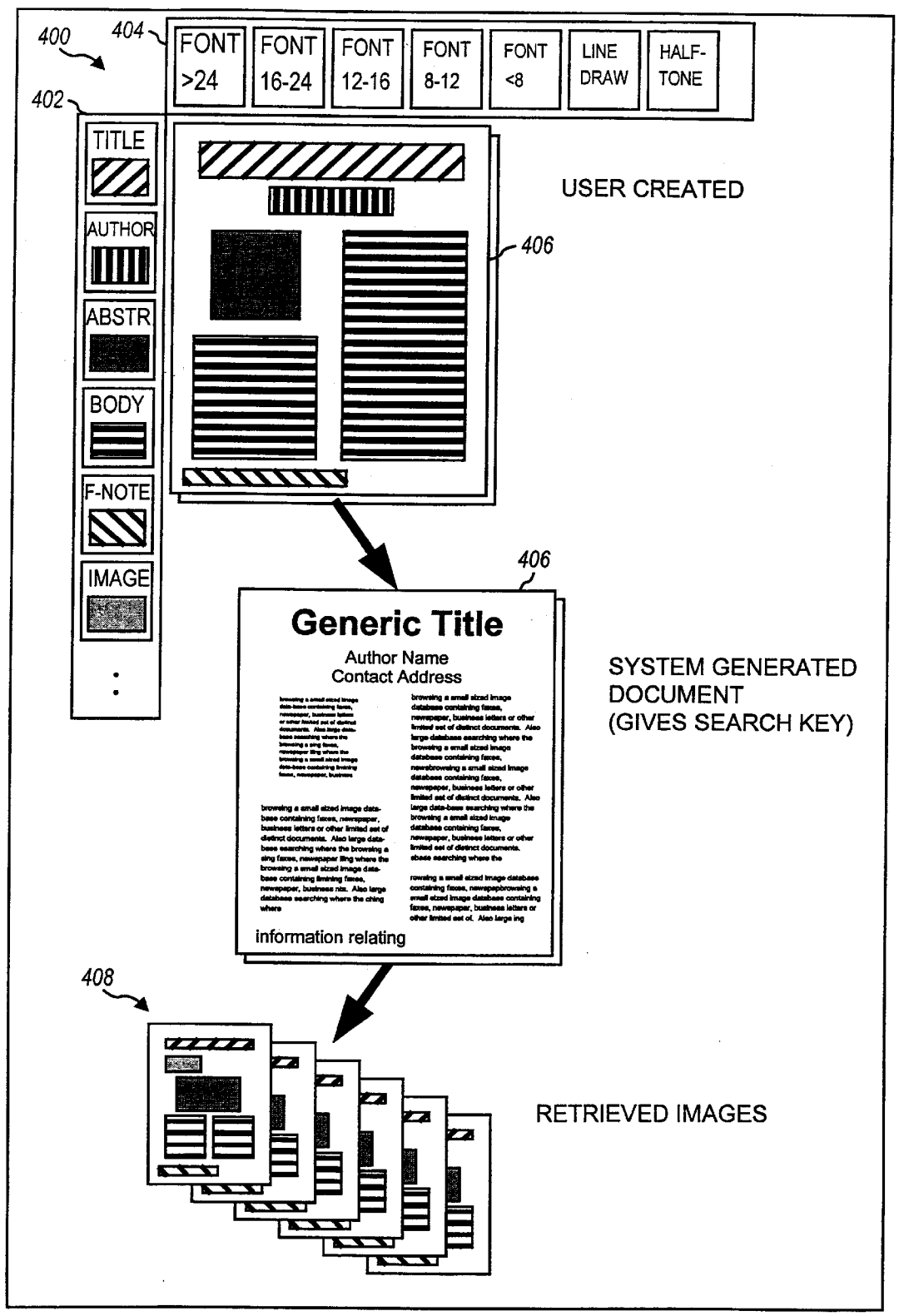
FIG. 4 depicts a user interface screen wherein a user may employ graphical tools to develop an example document image to initiate a search in accordance with one embodiment of the present invention.

FIG. 4 depicts a simplified representation of a user interface screen 400 wherein a user may employ graphical tools to develop an example document image to initiate a search in accordance with one embodiment of the present invention. User interface screen 400 offers more flexibility in specifying an example image than the system described in reference to FIG. 3.

The user follows a procedure along the lines that would be followed with typical computer-aided-drawing packages. The user selects a document component type such as header, author, title, body, footnote, image etc. using palette 402. Palette 404 is used to specify font size for text components and to distinguish between line drawn and half tone images for image component. Selecting a document component may include using mouse 38 to position a pointer over the relevant palette section, depressing a button on mouse 38, positioning the pointer at a desired point within a document image 406, and depressing the button again. The size and position of the document component may then be adjusted using techniques typical to computer-aided-drawing packages.

Numerous variations are possible on this user interface. To provide feedback to the user, the system could display actual text or graphic images in the designated positions within document image 406. Also, the user may specify the document texture with greater particularity by specifying the font size or type style of text areas of the document image.

After a series of interactions with user interface screen 400, an image such as document image 406 results and is available for use as an example image for search. A representative display 408 shows the results of searching based on example image 406.

In accordance with one embodiment of the present invention, a text query is combined with a texture query. A texture query would be formulated by development of an example image by any technique including the ones described above. A text query would include one or more text strings that would be found in a desired document. The search results would be limited to images meeting the criteria of both the texture query and the text query. This particular query technique is of course limited to image databases for which OCR results are available. First, document images including the desired pattern of text strings would be retrieved. The retrieved images are then searched for images having a texture similar to the specified one.

Alternatively, image texture are used to organize the results returned by a text query. First, document images including the desired pattern of text strings are retrieved. Clusters of documents with similar textures are then be grouped together. These groups of documents are displayed to the user, e.g., by using the overlay technique described earlier. This technique provides an easy way to distinguish between documents from different sources. For example, consider a database including images from newspapers and scientific journal articles. A text query may return documents from both types of sources. However, a user may only be interested in results from only one of them. Image texture clustering provides one method for a user to quickly distinguish newspaper articles from scientific journal articles.

Search Result Display

Figure 5:
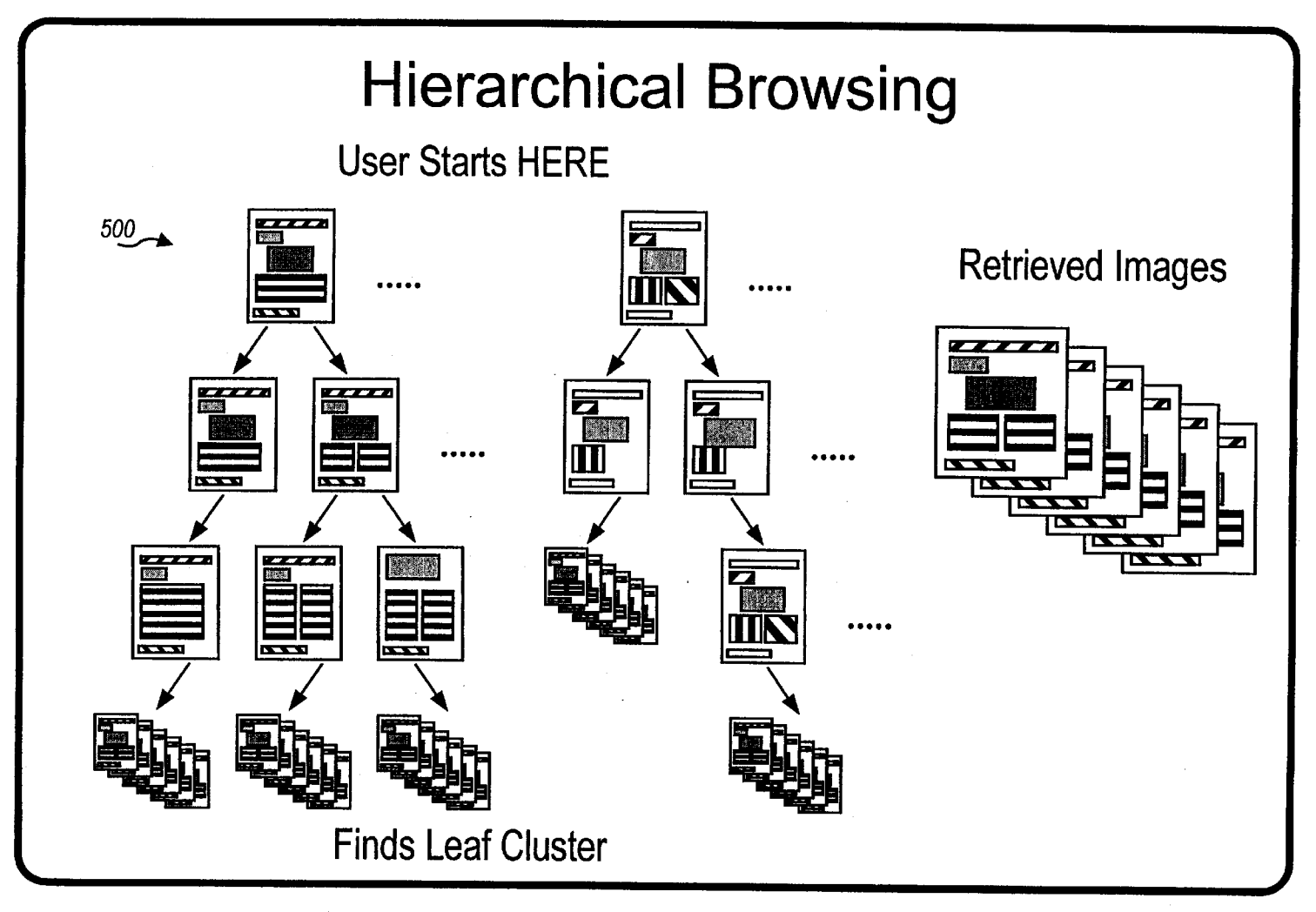

FIG. 5 depicts how search results may be displayed for a clustered image database in accordance with one embodiment of the present invention. A clustered image database is one where images are grouped together in a hierarchical structure according to their position in the space defined by the image feature vector. The database is divided into one or more groups. In turn, each group may consist of one or more subgroups. A description of clustering may be found in Duda & Hart, "Pattern Classification & scene Analysis," (John Wiley & Sons 1973), pgs. 228–237, the contents of which are herein incorporated by reference.

If there is only one level of hierarchy, when a query is made all the images in the cluster nearest the example document image in the image feature vector space are returned. FIG. 5 depicts browsing search results presented in the context of a multiple-level hierarchy of clusters. Level 500 shows icons representing cluster nodes. The user descends further into the hierarchy by selecting one of the icons as a key for further search. Eventually, the user may reach a leaf cluster, i.e. a group of actual images as opposed to cluster nodes. These images are then displayed.

One way of implementing the cluster based search is to recompute the cluster structure every time a query is submitted. Another way of implementing the cluster based search is to compute the cluster structure prior to search, preferably using texture information. The searching process described above then becomes essentially equivalent to navigating through a tree.

Figure 6:
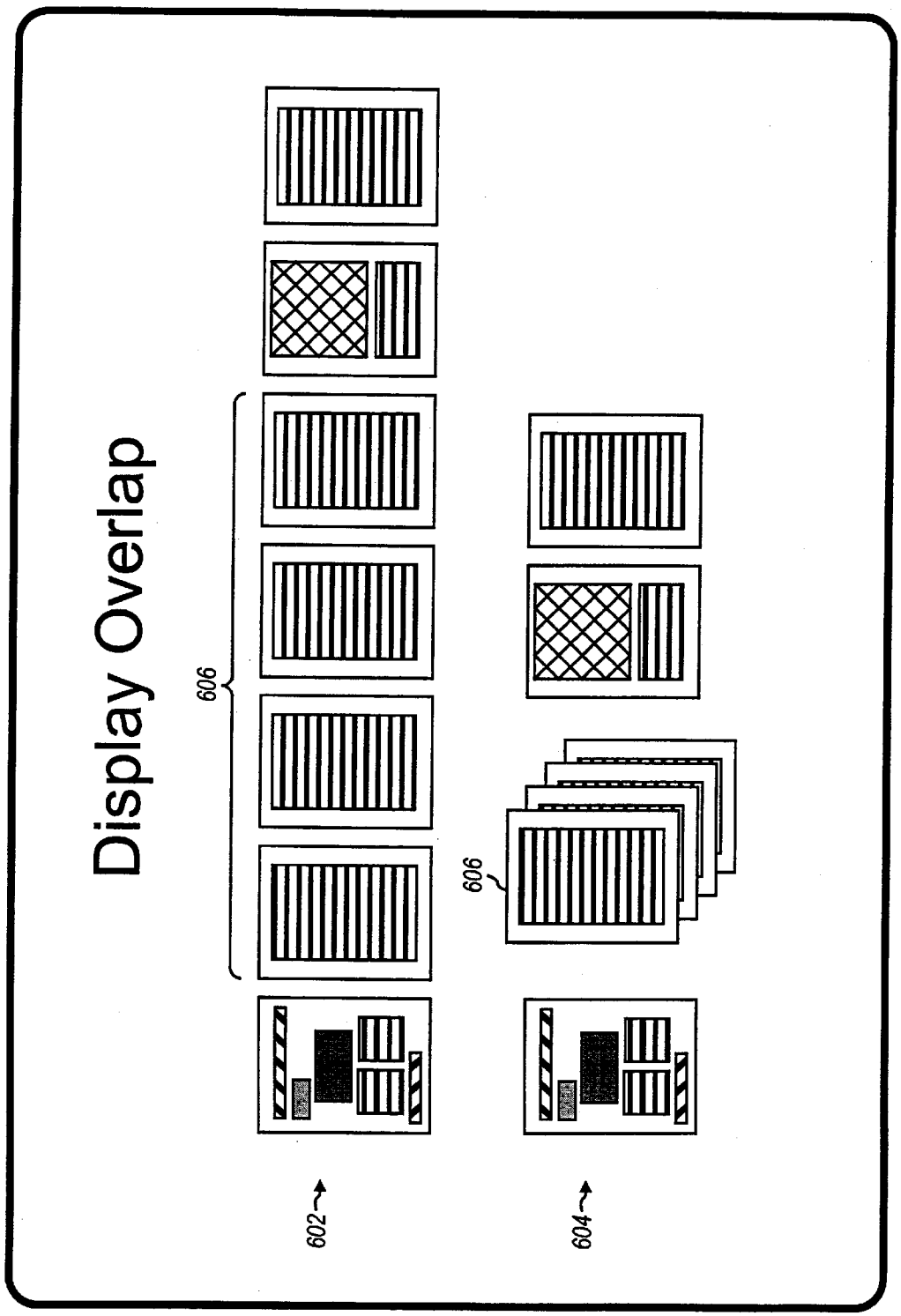
FIG. 6 depicts how images of multiple pages of a report may be displayed in accordance with one embodiment of the present invention.

FIG. 6 depicts an enhanced display for multiple page documents in accordance with one embodiment of the present invention. Often, a desired document image is one page of a many page report. For example, in the well-known Berkeley image database, reports of 50 pages are common. Many pages of these reports are all text and tend to exhibit similar texture features, rendering retrieval difficult. The pages that provide the most interesting features for the user to browse include the title page, page of contents, diagrams, figures, etc. These are also the pages which provide the best features from which to do further queries to the database.

Preferably, when search results are displayed, a multiple page document appears initially as a single image. However, by selecting this image, the user can cause the entire document to appear. A display 602 shows search results including multiple pages 606 of the same report having a similar appearance. One can see that for reports having hundreds of pages, the display soon becomes cluttered with repetitive images. An enhanced display 604 shows multiple pages 606 of the same report with their images superimposed with a slight offset from page to page. Enhanced display 604 shows much less clutter.

To achieve the enhanced display, when a multiple page report is to be displayed pages having a substantially similar appearance are identified by comparing their image feature information. The images of these pages are then displayed with their images superimposed with offset from page to page.

Feature Vector Extraction

Figure 7A:
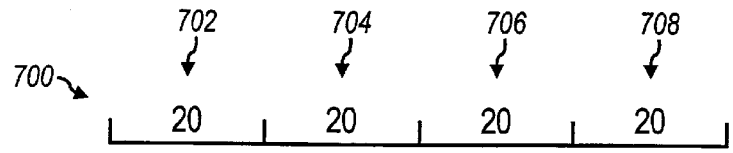
FIG. 7A depicts the elements of a feature vector extracted from a document image in accordance with one embodiment of the present invention.

FIG. 7A depicts the elements of a feature vector 700 extracted from a document image in accordance with one embodiment of the present invention. Preferably, feature vector 700 includes 80 elements including four groups of 20 elements. A first group 702 of 20 elements represents a histogram of connected component sizes and is further discussed in reference to FIG. 7B. A second group 704 of 20 elements represents a distribution of interest points throughout cells of the document image and is further discussed with reference to FIG. 7C. A third group 706 of 20 elements represents a vertical projection histogram of connected component density and is discussed further in reference to FIG. 7C. A fourth group 708 of twenty elements represents a distribution of connected components throughout cells of the document and is discussed further in reference to FIG. 7D.

Figure 7B:
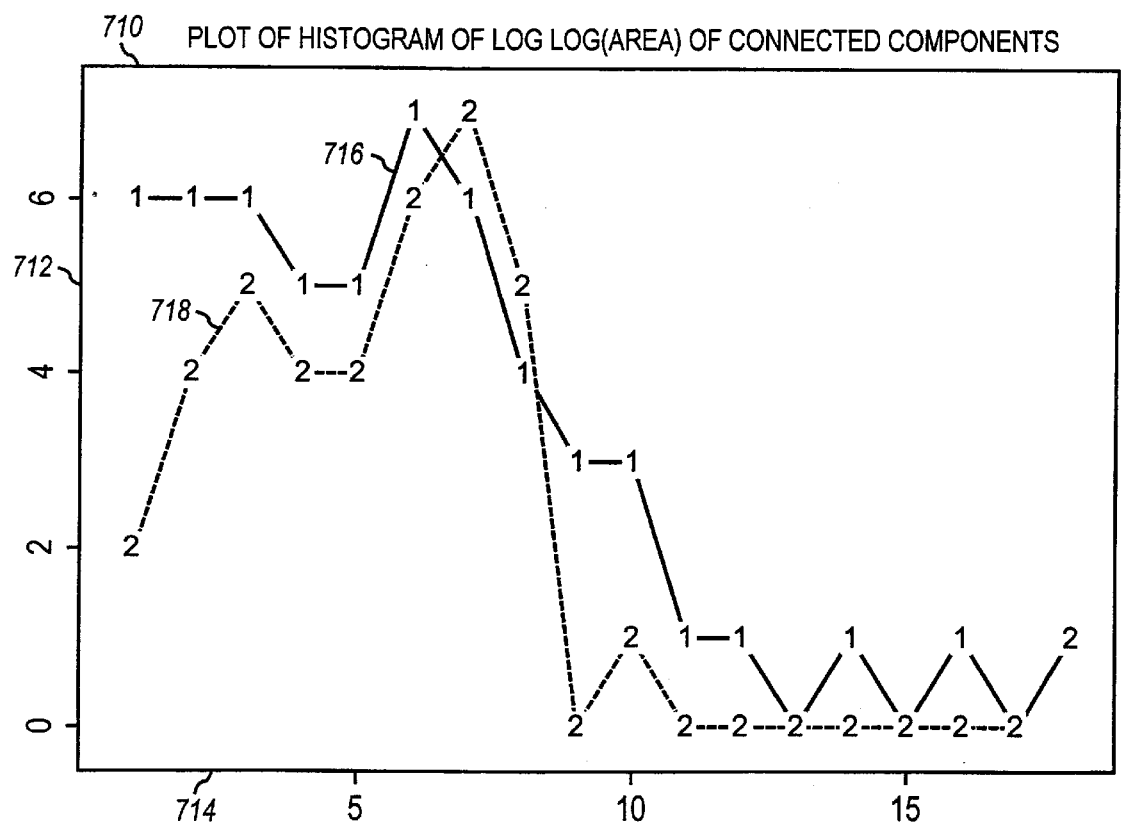
FIG. 7B depicts a connected component size histogram as would be incorporated within a feature vector in accordance with one embodiment of the present invention.

FIG. 7B depicts a connected component size histogram 710 as would be incorporated within feature vector 702 in accordance with one embodiment of the present invention. Histogram 710 is based on connected component size information obtained from the image. A single connected component is a set of contiguous black pixels in an image. To determine the size of a connected component, the preferred embodiment finds the area of the minimum-sized rectangular box that encloses it. All other ways of determining connected component size would also fit within the scope of the present invention. For example, the diagonal dimension of the enclosing rectangular box might be the connected component size. Although not a feature of the preferred embodiment, filtering may be applied to the image before determining the connected component size.

Horizontal and vertical axes 714 and 712 of the histogram are preferably normalized to a logarithmic scale. Although not a feature of the preferred embodiment, weighting could also be applied to the histogram bins. A plot 716 shows the histogram for a representative page of a magazine. A plot 718 shows the histogram for a representative page of a technical journal. As can be seen, the information from this histogram is useful for distinguishing between different types of documents.

The second group 704 of 20 feature vector elements are based on interest point information. Interest points are pixels within an image that lie within areas that have distinctive features. Each interest point has an identified interest level. As is well known in the art, interest points and their associated interest levels are found by applying so-called interest operators to the pixels of an image. The preferred embodiment takes advantage of a modified Moravec operator.

For each pixel, the modified Moravec variance operator is determined at each of six radii from the pixel. For a given pixel and radius, the interest level value is the variance of the pixel values of the four pixels located at the given radius, above, below, to the left, and to the right of the given pixel. Typically, document images are binary and the pixel values are either zero or full scale. The interest levels values are sorted into three bins, low interest value, medium interest value, and high interest value. Other interest operators could also be employed within the scope of the present invention. A survey of interest operators is found in Yan, "Interest Operators and Fast Implementation" International Archives of Photogrammetry and Remote Sensing, Vol 27-II, Japan, pp. 491–500, 1988, the contents of which are incorporated herein by reference for all purposes.

Each combination of radius and interest level bin is assigned to an element in second group 704. The element's value is a normalized representation of the number of pixels having the interest level value and radius associated with the element. Since there are 6 radii and three interest level value bins, this accounts for 18 of the twenty elements in second group 704.

The two remaining elements of second group 704 hold special values. One element holds a value corresponding to the ratio of the number of black pixels in the image to the total number of pixels. Another element holds a value corresponding to a total number of black to white transitions discovered in a horizontal scan through the image.

Figure 7C:
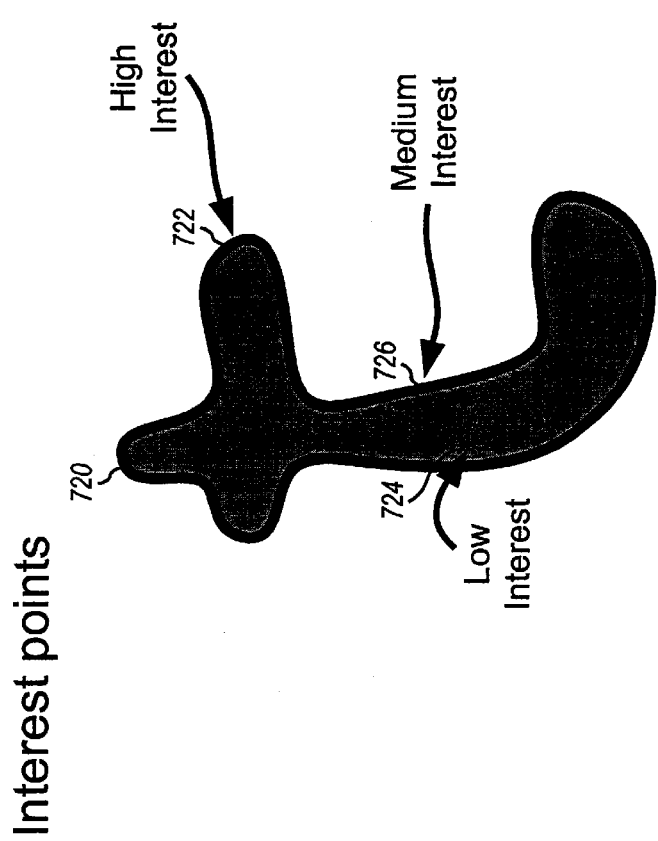
FIG. 7C depicts how interest operator information as would be incorporated within a feature vector in accordance with one embodiment of the present invention operates to distinguish among documents having different font sizes.

FIG. 7C demonstrates the usefulness of interest point information for distinguishing document images. FIG. 7C shows a letter "t" 720 with the interest levels present at various parts of the letter. A pixel 722 at a corner has a high interest level. A pixel 724 in the interior has a low interest level. A pixel 726 along an edge has a medium interest level.

Figure 7D:
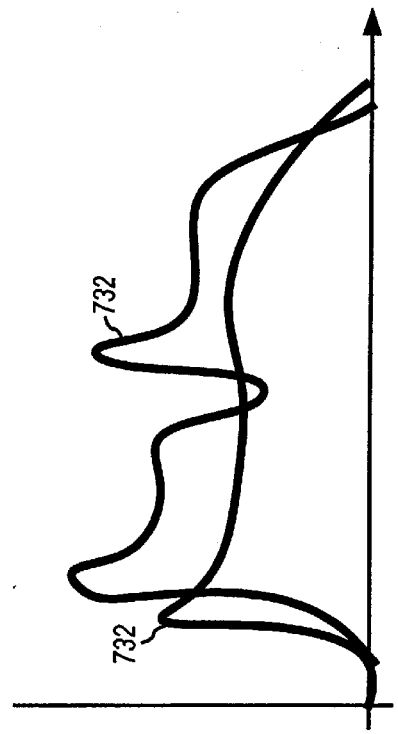
FIG. 7D depicts a vertical projection connected component histogram as would be incorporated within a feature vector in accordance with one embodiment of the present invention.

FIG. 7D depicts a vertical projection connected component histogram as would be incorporated within a feature vector in accordance with one embodiment of the present invention. To obtain the third group 706 of the feature vector, the image is divided into twenty vertical stripes. Each element of the third group corresponds to a population of connected components having a size above a minimum threshold in a particular vertical stripe. In the preferred embodiment, this minimum threshold is a height and width both greater than one pixel. This third group 706 is particularly useful in distinguishing among documents having different numbers of columns of text. A first document 730 having a single column of text gives projection histogram plot 732. A second document 734 having two columns of text gives a projection histogram 736. As can be seen, projection histogram 732 has one peak corresponding to the single column whereas projection histogram 736 has two peaks corresponding to the two columns.

Figure 7E:
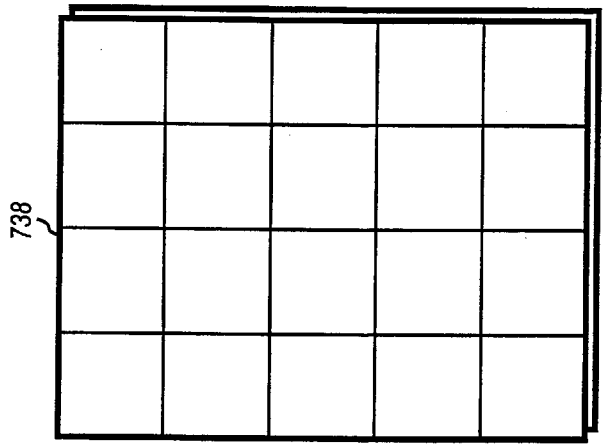
FIG. 7E depicts how the distribution of connected components among grid cells as would be incorporated within a feature vector in accordance with one embodiment of the present invention operates to distinguish among documents having different arrangements of components.
Figure 7E:
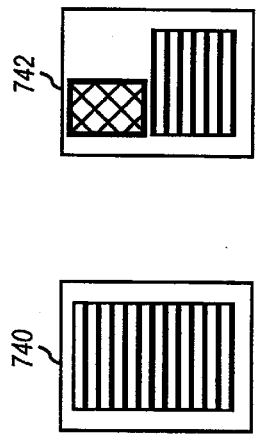

FIG. 7E depicts how the distribution of connected components among grid cells as would be incorporated within a feature vector in accordance with one embodiment of the present invention operates to distinguish among documents having different arrangements of components. The fourth group 708 of elements is obtained by dividing the image into a 5×4 array 738 of cells and finding the population of connected components above a threshold size in each cell. In the preferred embodiment, this component size is a height and width greater than one pixel. The population of connected components of each cell is then normalized in relation to a total number of connected components for the image as a whole. This fourth group 708 is particularly useful in distinguishing among documents such as documents 740 and 742 that have different arrangements of document components.

Extraction of image feature information from example document images developed through category selection as described in reference to FIG. 3 or developed through a graphical user interface as described in reference to FIG. 4 follows a modified procedure. With the category selection scheme of FIG. 3, there are a limited number of possible example document images. To broaden the number of possible example document images, one procedure is to, for each combination of category selections, provide a corresponding actual document image having the selected characteristics. This image may then serve as the basis for image feature extraction as described above in reference to FIGS. 7A–7E.

For example images developed using the techniques discussed in reference to FIG. 4, one procedure is to construct an actual document image by combining sample image material corresponding to each selected component. For text components, actual text is included. For graphics, a sample graphic image is included. The so-constructed actual document image then serves as the basis for image feature extraction.

Search Results

Figure 8:
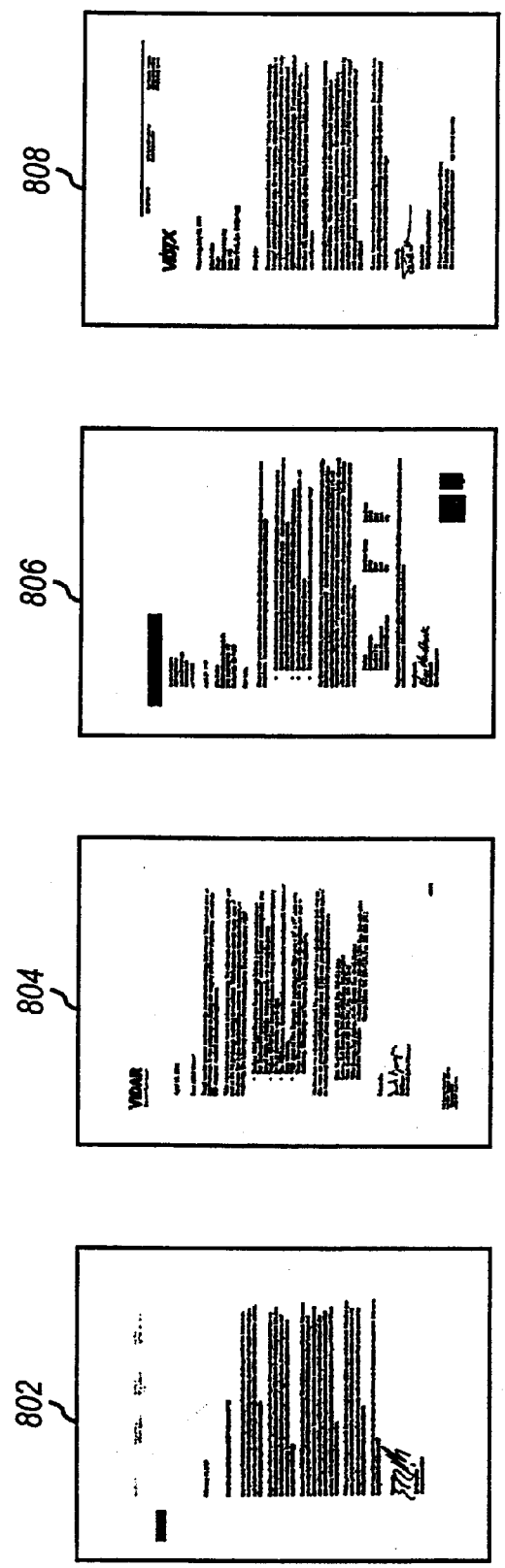
FIG. 8 shows a representative example document image used for search in accordance with the present invention and search results.

FIG. 8 shows a representative example document image 802 used as an example for search in accordance with the present invention and search results. By using example image 802 as the key for search, images 804, and 806 and 808 from a database of 971 images including journals, letters, magazines, brochures, newspapers, catalogs, and handwritten text. The example image 802 is a business letter and all of the search results are also business letters. As can be seen, the search system of the invention provides images visually similar to the example image.

In the foregoing specification, the invention has been described with reference to specific exemplary embodiments thereof. It will, however, be evident that various modifications and changes may be made thereunto without departing from the broader spirit and scope of the invention as set forth in the appended claims.

For example, although the above description is written in reference to binary images, the techniques of the present invention are also applicable to gray scale images. Interest point techniques are well known in the art for gray scale images. Connected component information may be obtained from a gray scale image by first applying a threshold function to the gray scale values and then finding contiguous groups of pixels having values above the chosen threshold.

The search techniques described above may also be applied to color images with appropriate modifications to the image feature vector. For example, the image feature vector could be extended to include elements corresponding to median CMYK values over various cells of the image.

Also, for enhanced accuracy in comparing visual appearance of images, an image feature vector with a much greater number of elements could be used. For example, the document image could be divided into 20 cells. A 60 element vector corresponding to the first three groups of feature element vector 700 could then be computed for each cell. The aggregation of all these 60 element vectors would be a 1200 element feature vector which could serve as the basis for searching and browsing an image database.

Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for searching a document image database comprising:

developing an example document image;

obtaining image feature information about said example document image;

searching, using said image feature information, the document image database;

displaying search results of said search step;

accepting user input selecting a given search result and;

when requested by said user input, performing further iterative searching by using said selected search result as a new example document image.

2. The method of claim 1 wherein said developing comprises scanning in said example document image.

3. The method of claim 1 wherein said developing comprises accepting user input specifying characteristics of said example document image.

4. The method of claim 1 wherein said developing comprises operating a graphical system wherein a user specifies and arranges components of said example document image.

5. The method of claim 1 wherein said image feature information comprises information about interest points in said example document image.

6. The method of claim 1 wherein said image feature information comprises information about connected components in said example document image.

7. The method of claim 1 wherein said image feature information comprises information about distribution of connected components in said example document image.

8. The method of claim 1 wherein said obtaining comprises determining an image feature vector for said example document image.

9. The method of claim 8 wherein said searching comprises comparing said image feature vector for said example document image to image feature vectors of document images in said database.

10. The method of claim 9 further comprising:

accepting user input specifying a search text string, and wherein said searching further comprises comparing said search text string to OCR data associated with said document images in said database.

11. The method of claim 1 wherein said displaying comprises displaying one or more document images texturally similar to said example document image.

12. The method of claim 1 wherein said displaying comprises displaying icons representing clusters of images textually similar to said example document image as a search result.

13. The method of claim 1 wherein said document image database comprises document images in encrypted form and image feature information for said encrypted document images.

14. The method of claim 13 wherein said searching comprises searching said image feature information stored in said document image data base, and wherein said displaying step comprises decrypting search results of said searching.

15. The method of claim 1 wherein said document image database comprises document images in compressed form and image feature information for said compressed document images.

16. The method of claim 15 wherein said searching comprises searching said image feature information stored in said document image database, and wherein said displaying comprises decompressing search results of said searching.

17. The method claim 1 wherein said developing comprises accepting user input specifying a category of said document.

18. The method claim 1 wherein said developing comprises accepting user input specifying a number of columns of text of said document.

19. The method claim 1 wherein said developing comprises accepting user input specifying an organization of said document.

20. The method claim 1 wherein said developing comprises:

accepting user input specifying a category of said document;

accepting user input specifying a number of columns of text of said document;

accepting user input specifying an organization of said document; and developing said example document of said category and having said organization and said number of columns.

21. The method claim 1 wherein said displaying comprises:

comparing image feature information of images of pages of said documents;

identifying pages having a similar appearance based on said image feature information; and displaying pages having a similar appearance superimposed over one another with offset among them.

22. A method of extracting a feature vector from an electronically stored image comprising:

measuring the size of connected components throughout said image;

identifying interest levels of pixels throughout said image;

identifying connected components and their sizes throughout said image;

storing a histogram of connected component sizes as a first group of elements of said feature vector; and storing a histogram of interest levels of pixels as a second group of elements of said feature vector.

23. The method of claim 22 further comprising:

storing a histogram of connected component population in vertical sections of said image as a third group of elements of said feature vector.

24. The method of claim 22 further comprising:

storing the number of connected components in a plurality of regions of said image as a fourth group of elements of said feature vector.

25. A document image browsing system comprising:

an electronic storage unit that stores a document image database;

an input device for accepting user input;

a display that displays document images;

a processor unit coupled to said electronic storage device and said display, said processor unit operative to:
develop an example document image;
obtain image feature information about said example document image; and
when requested by said user input, iteratively search said document image database for document images similar to said example document image, wherein said search is performed using said image feature information, and wherein a new search is based on a new example document image that is selected from a search result of a previous search.

26. Software on a storage medium comprising:

software for developing an example document image;

software for obtaining image feature information about said example document image;

software for searching, using said image feature information, the document image database;

software for displaying search results of said searching software;

software for accepting user input selecting a displayed search result; and software for performing, when requested by said user input, further iterative searching by using said selected search result as a new example document image.

27. The software of claim 26 wherein said developing software comprises software for accepting user input specifying characteristics of said example document image.

28. The software of claim 26 wherein said developing software comprises software for operating a graphical system wherein a user specifies and arranges components of said example document image.

29. The software of claim 26 wherein said obtaining software comprises software for extracting an image feature vector for said example document image.

30. The software of claim 29 wherein said searching software comprises software for comparing said image feature vector for said example document image to image feature vectors of document images in said database.

31. The software of claim 30 further comprising software for accepting user input specifying a search text string and wherein said searching software further comprises software for comparing said search text string to OCR data associated with said document images in said database.

32. The software of claim 26 wherein said developing software comprises software for accepting user input specifying a category of said document.

33. The software of claim 26 wherein said developing software comprises software for accepting user input specifying a number of columns of text of said document.

34. The software of claim 26 wherein said developing software comprises software for accepting user input specifying an organization of said document.

35. The software of claim 26 wherein said developing software comprises:

software for accepting user input specifying a category of said document;

software for accepting user input specifying a number of columns of text of said document;

software for accepting user input specifying an organization of said document; and software for developing said example document of said category and having said organization and said number of columns.

36. The software of claim 26 wherein said displaying software comprises:

software for comparing image feature information of images of pages of said documents;

software for identifying pages having a similar appearance based on said image feature information; and software for displaying pages having a similar appearance superimposed over one another with offset among them.

* * * * *